United States Patent

Kosugi

(10) Patent No.: US 8,023,219 B2
(45) Date of Patent: Sep. 20, 2011

(54) STORAGE DEVICE, HEAD POSITION DETECTION METHOD AND CONTROL CIRCUIT

(75) Inventor: Tatsuhiko Kosugi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 52 days.

(21) Appl. No.: 12/569,593

(22) Filed: Sep. 29, 2009

(65) Prior Publication Data

US 2010/0073807 A1 Mar. 25, 2010

Related U.S. Application Data

(63) Continuation of application No. PCT/JP2007/059856, filed on May 14, 2007.

(51) Int. Cl.
*G11B 5/596* (2006.01)
*G11B 5/02* (2006.01)

(52) U.S. Cl. ........................ 360/77.06; 360/29

(58) Field of Classification Search ................. None
See application file for complete search history.

(56) References Cited

U.S. PATENT DOCUMENTS

| 5,694,265 | A | 12/1997 | Kosugi et al. | |
|---|---|---|---|---|
| 6,496,312 | B2 * | 12/2002 | Blaum et al. | 360/49 |
| 7,262,932 | B2 * | 8/2007 | Asakura et al. | 360/77.08 |
| 7,312,946 | B2 * | 12/2007 | Asakura et al. | 360/77.06 |
| 7,342,734 | B1 * | 3/2008 | Patapoutian et al. | 360/29 |
| 2002/0131188 | A1 | 9/2002 | Hamaguchi et al. | |
| 2006/0245105 | A1 | 11/2006 | Asakura et al. | |

FOREIGN PATENT DOCUMENTS

| JP | A 7-287949 | 10/1995 |
|---|---|---|
| JP | A 2000-215627 | 8/2000 |
| JP | A 2006-309843 | 11/2006 |

\* cited by examiner

*Primary Examiner* — Daniell L Negron
(74) *Attorney, Agent, or Firm* — Greer, Burns & Crain, Ltd

(57) ABSTRACT

According to one embodiment, a storage device includes an area demodulator and a head position demodulator. The area demodulator demodulates a first demodulation signal and a second demodulation signal having a phase difference of 90° from a read signal by a head of an area demodulation pattern recorded on a medium. The head position demodulator receives the first demodulation signal and the second demodulation signal, and outputs a phase angle indicating a direction of a vector formed in a phase plane by the first demodulation signal and the second demodulation signal as a head position signal.

12 Claims, 17 Drawing Sheets

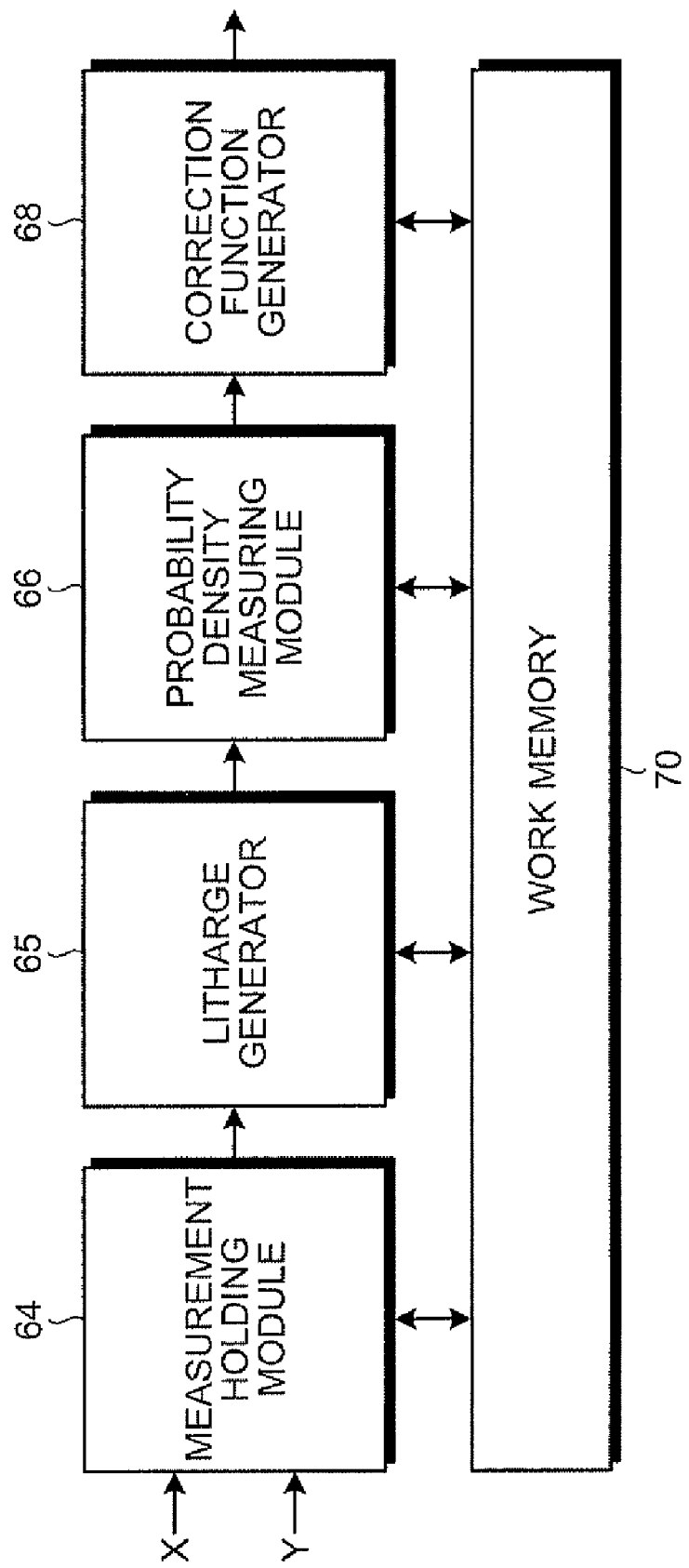

FIG.10

| RATIO DIVIDED ZONE | $0 < R \leq 0.125$ | $0.125 < R \leq 0.25$ | $0.25 < R \leq 0.375$ | $0.375 < R \leq 0.5$ | $0.5 < R \leq 0.625$ | $0.625 < R \leq 0.75$ | $0.75 < R \leq 0.875$ | $0.875 < R \leq 1$ |
|---|---|---|---|---|---|---|---|---|
| FIRST QUADRANT | N11 | N12 | N13 | N14 | N15 | N16 | N17 | N18 |
| SECOND QUADRANT | N21 | N22 | N23 | N24 | N25 | N26 | N27 | N28 |
| THIRD QUADRANT | N31 | N32 | N33 | N34 | N35 | N36 | N37 | N38 |
| FOURTH QUADRANT | N41 | N42 | N43 | N44 | N45 | N46 | N47 | N48 |
| FIFTH QUADRANT | N51 | N52 | N53 | N54 | N55 | N56 | N57 | N58 |
| SIXTH QUADRANT | N61 | N62 | N63 | N64 | N65 | N66 | N67 | N68 |
| SEVENTH QUADRANT | N71 | N72 | N73 | N74 | N75 | N76 | N77 | N78 |
| EIGHTH QUADRANT | N81 | N82 | N83 | N84 | N85 | N86 | N87 | N88 |
| TOTAL | N1 | N2 | N3 | N4 | N5 | N6 | N7 | N8 |

WORK TABLE 92

FIG.15

CORRECTION CALCULATION TABLE
108

| QUADRANT | CORRECTION CALCULATION |
| --- | --- |
| FIRST QUADRANT | 0°+θ |
| SECOND QUADRANT | 90°-θ |
| THIRD QUADRANT | 90°+θ |
| FOURTH QUADRANT | 180°-θ |
| FIFTH QUADRANT | 180°+θ |
| SIXTH QUADRANT | 270°-θ |
| SEVENTH QUADRANT | 270°+θ |
| EIGHTH QUADRANT | 360°-θ |

FIG.16

QUADRANT DETERMINATION TABLE
110

| QUADRANT | MAGNITUDE RELATIONSHIP OF \|X\|, \|Y\| | SIGN OF X, Y |
| --- | --- | --- |
| FIRST QUADRANT | \|X\|>\|Y\| | (+, +) |
| SECOND QUADRANT | \|X\|<\|Y\| | (+, +) |
| THIRD QUADRANT | \|X\|<\|Y\| | (-, +) |
| FOURTH QUADRANT | \|X\|>\|Y\| | (-, +) |
| FIFTH QUADRANT | \|X\|>\|Y\| | (-, -) |
| SIXTH QUADRANT | \|X\|<\|Y\| | (-, -) |
| SEVENTH QUADRANT | \|X\|<\|Y\| | (+, -) |
| EIGHTH QUADRANT | \|X\|>\|Y\| | (+, -) |

FIG.17

CORRECTION FUNCTION CONVERSION TABLE
50

| | | | | | | | |
|---|---|---|---|---|---|---|---|
| RATIO R | 0 | 0.125 | 0.20 | 0.5 | 0.625 | 0.75 | 0.875 | 1 |
| NORMALIZE VALUE | 0 | 0.22 | 0.34 | 0.47 | 0.59 | 0.71 | 0.86 | 1 |
| PHASE ANGLE θ | 0° | 9.90° | 15.30° | 21.15° | 26.55° | 31.95° | 38.70° | 45.00° |

FIG.18

ARCTANGENT FUNCTION CONVERSION TABLE
112

| RATIO R | 0 | 0.125 | 0.20 | 0.5 | 0.625 | 0.75 | 0.875 | 1 |
|---|---|---|---|---|---|---|---|---|
| PHASE ANGLE θ | $\tan^{-1}(0)=0°$ | $\tan^{-1}(0.125)$ | $\tan^{-1}(0.25)$ | $\tan^{-1}(0.5)$ | $\tan^{-1}(0.626)$ | $\tan^{-1}(0.75)$ | $\tan^{-1}(0.875)$ | $\tan^{-1}(1)=45°$ |

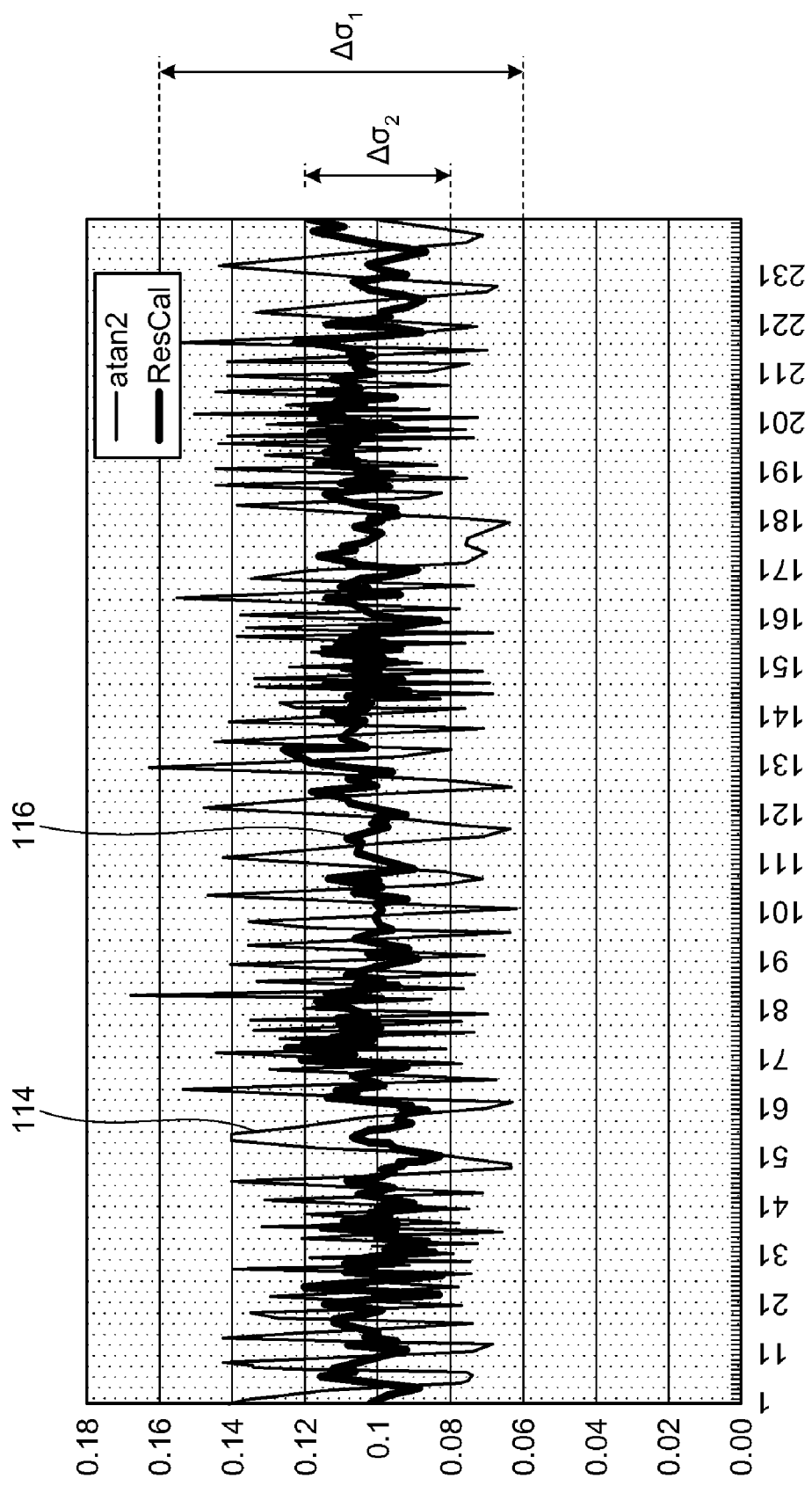

STORAGE DEVICE, HEAD POSITION DETECTION METHOD AND CONTROL CIRCUIT

CROSS-REFERENCE TO RELATED APPLICATIONS

This application is a continuation of PCT international application Ser. No. PCT/JP2007/059856 filed on May 14, 2007 which designates the United States, incorporated herein by reference.

BACKGROUND

1. Field

One embodiment of the invention relates to a storage device, a head position detection method, and a control circuit for detecting a head position from a head read signal.

2. Description of the Related Art

Phase demodulation and area demodulation have been known as demodulation to detect the head position from a servo pattern recorded on a magnetic disc medium.

In the phase demodulation, a predetermined phase servo pattern is recorded on a magnetic disc medium and a phase angle indicating the head position is demodulated from a head read signal. The head position obtained as a result of the demodulation is linear since a track boundary does not exist, in principle, in phase demodulation.

On the other hand, in the area demodulation, an area demodulation pattern known as a two-phase servo pattern is recorded on a magnetic disc medium. Then, two types of demodulation signals, which differ in phase by 90°, are generated by addition and subtraction of a head read signal, and the head position is detected by switching the demodulation signal at the track boundary. Reference may be had to, for example, Japanese Patent Application Publication (KOKAI) No. 2000-215627 and Japanese Patent Application Publication (KOKAI) No. 7-287949.

In such conventional area demodulation, however, it is difficult to smoothly connect two types of demodulation signals at the track boundary due to difference in gain, etc. of the demodulation signals, and a position signal may be discontinuous.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 4 is an exemplary functional block diagram of a function correction module in the embodiment;

FIG. 10 is an exemplary diagram of a work table indicating, by dividing the ratio of zero to one into eight zones for eight quadrants of FIG. 8 or 9, the probability density of each zone and the total sum thereof in the embodiment;

FIG. 15 is an exemplary diagram of a correction calculation table indicating the correction calculation of the phase angle corresponding to the quadrant determination in the embodiment;

FIG. 16 is an exemplary diagram of a quadrant determination table for determining the quadrant from the demodulation signals X, Y in the embodiment;

FIG. 17 is an exemplary diagram of the correction function conversion table generated from the cumulative probability density of FIG. 11 in the embodiment;

FIG. 18 is an exemplary diagram of a non-corrected arctangent function conversion table in the embodiment; and FIG. 19 is an exemplary graph of the actual measurement result of non-repeatable run-out (NRRO) in units of servo frames obtained from the head position in the on-track control state using the correction function conversion table and the non-corrected arctangent function conversion table in the embodiment.

DETAILED DESCRIPTION

Various embodiments according to the invention will be described hereinafter with reference to the accompanying drawings. In general, according to one embodiment of the invention, a storage device comprises an area demodulator and a head position demodulator. The area demodulator is configured to demodulate a first demodulation signal and a second demodulation signal having a phase difference of 90° from a read signal by a head of an area demodulation pattern recorded on a medium. The head position demodulator is configured to receive the first demodulation signal and the second demodulation signal, and output a phase angle indicating a direction of a vector formed in a phase plane by the first demodulation signal and the second demodulation signal as a head position signal.

According to another embodiment of the invention, there is provided a head position detection method comprising: an area demodulator demodulating a first demodulation signal and a second demodulation signal having a phase difference of 90° from a read signal by a head of an area demodulation pattern recorded on a medium; and a head position demodulator receiving the first demodulation signal and the second demodulation signal, and outputting a phase angle indicating a direction of a vector formed in a phase plane by the first demodulation signal and the second demodulation signal as a head position signal.

According to still another embodiment of the invention, a control circuit comprises an area demodulator and a head position demodulator. The area demodulator is configured to demodulate a first demodulation signal and a second demodulation signal having a phase difference of 90° from a read signal by a head of an area demodulation pattern recorded on a medium. The head position demodulator is configured to receive the first demodulation signal and the second demodulation signal, and output a phase angle indicating a direction of a vector formed in a phase plane by the first demodulation signal and the second demodulation signal as a head position signal.

Figure 1:
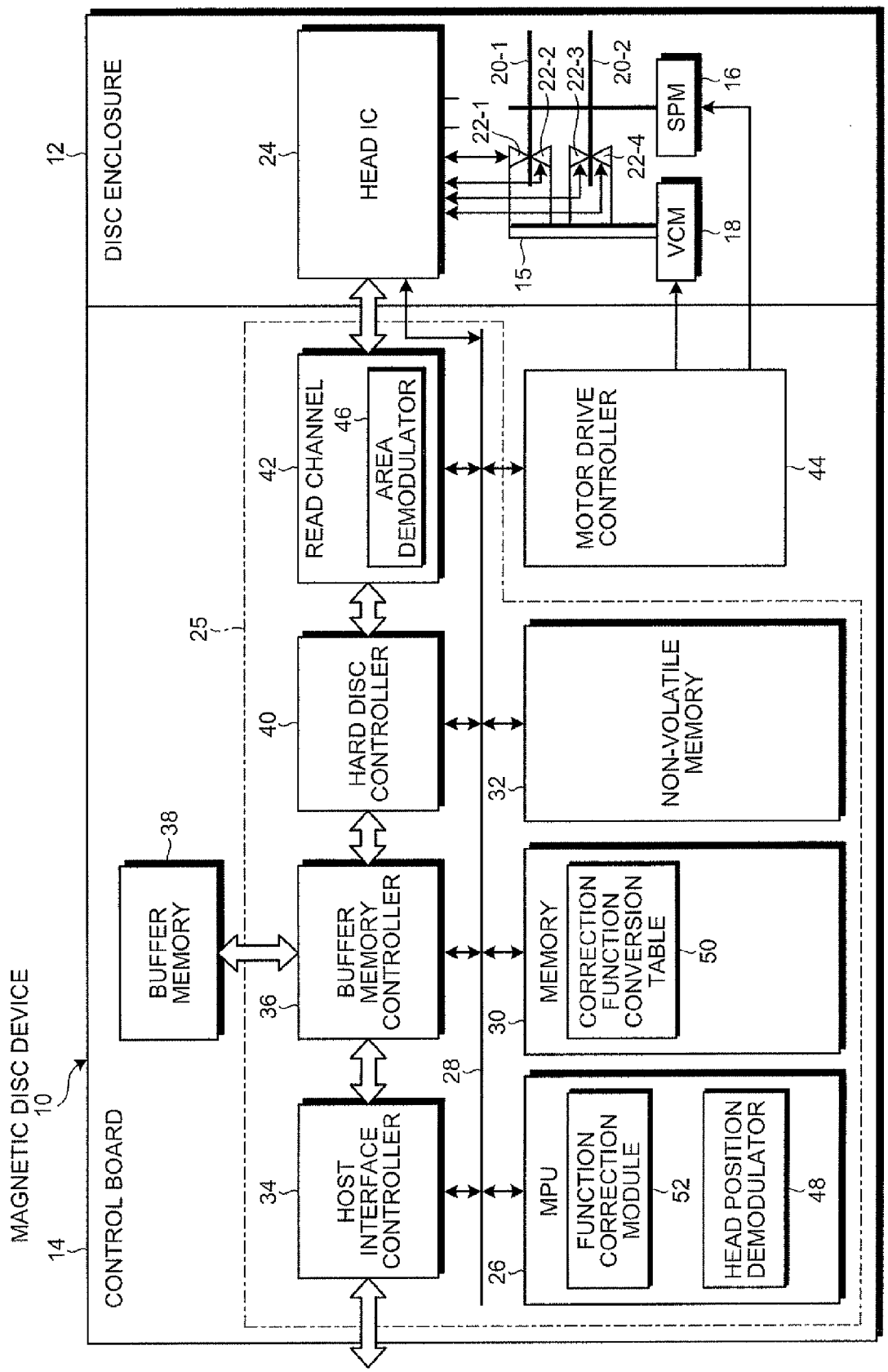
FIG. 1 is an exemplary block diagram of a magnetic disc device to which is applied a head position detection according to an embodiment of the invention.

FIG. 1 is a block diagram of a magnetic disc device 10 according to an embodiment of the invention. As illustrated in FIG. 1, the magnetic disc device 10, such as, for example, a hard disc drive (HDD), comprises a disc enclosure 12 and a control board 14. The disc enclosure 12 comprises a spindle motor (SPM) 16, where magnetic discs (storage media) 20-1, 20-2 are attached to a rotation shaft of the spindle motor 16 and are rotated at a constant speed of, for example, 4200 rpm.

The disc enclosure 12 further comprises a voice coil motor (VCM) 18. The voice coil motor 18 has heads 22-1 to 22-4 at an end of an arm of a head actuator 15, and performs positioning of the head with respect to the recording surfaces of the magnetic discs 20-1, 20-2.

The heads 22-1 to 22-4 are complex heads in which a recording element and a reading element are integrated. A recording element of longitudinal magnetic recording type or a recording element of perpendicular magnetic recording type is used for the recording element. In the case of the recording element of perpendicular magnetic recording type, a perpendicular storage medium comprising a recording layer and a soft magnetic backing layer is used for the magnetic discs 20-1, 20-2. A GMR element or a TMR element is used for the reading element.

The heads 22-1, 22-2 are connected by a signal line to a head IC 24, and the head IC 24 selects one head with a head select signal based on a write command or a read command from a host, i.e., a high-order device, and performs write or read. The head IC 24 comprises a write driver for the write system and a preamplifier for the read system.

The control board 14 comprises an MPU 26 and a memory 30 for storing control programs and control data using an RAM, and a non-volatile memory 32 for storing control programs using an FROM and the like are arranged with respect to a bus 28 of the MPU 26.

The bus 28 of the MPU 26 is arranged with a host interface controller 34, a buffer memory controller 36 for controlling a buffer memory 38, a hard disc controller 40 functioning as a format, a read channel 42 functioning as a write modulator and a read demodulator, and a motor drive controller 44 for controlling the voice coil motor 18 and the spindle motor 16.

Furthermore, the MPU 26, the memory 30, the non-volatile memory 32, the host interface controller 34, the buffer memory controller 36, the hard disc controller 40, and the read channel 52 arranged on the control board 14 configure a control circuit 25, which the control circuit 25 is realized as one LSI circuit.

The magnetic disc device 10 performs a write process and a read process based on a command from the host. The usual operation in the magnetic disc device will be described below.

On receipt of the write command and the write data from the host at the host interface controller 34, the write command is deciphered by the MPU 26, the received write data is stored in the buffer memory 38, as necessary, and converted to a predetermined data format by the hard disc controller 40 and added with an ECC code by an ECC coding process, subjected to scramble, RLL code conversion, and write compensation in a write modulation system of the read channel 42, and then written to a magnetic disc 20 from the write head of the head 22-1 and the like selected from the write amplifier through the head IC 24.

In this case, the MPU 26 provides a positioning signal to the motor drive controller 44 using a DSP and the like so that the voice coil motor 18 seeks the head to a target track instructed by the command and on-tracks the same to perform a track following control.

On receipt of the read command from the host at the host interface controller 34, the read command is deciphered by the MPU 26, the read signal read out from the read head selected by the head select of the head IC 24, is amplified by the preamplifier and then input to the read modulation system of the read channel 42, the read data is demodulated by partial response maximum likelihood detection (PRML) and the like, the error is corrected by performing the ECC decoding process in the hard disc controller 40, and then buffered in the buffer memory 38, and the read data is transferred from the host interface controller 34 to the host.

In the magnetic disc device 10, to detect the head position for positioning the heads 22-1 to 22-4 to the disc surfaces of the magnetic discs 20-1, 20-2, an area demodulator 46 is provided in the read channel 42 and a head position demodulator 48 serving as a function realized by the execution of the program is provided in the MPU 26.

The area demodulator 46 demodulates a first demodulation signal X and a second demodulation signal Y having a phase difference of 90° from the read signal of the head of the area demodulation pattern of the servo frame recorded in units of a constant angle on each disc surface of the magnetic discs 20-1, 20-2. In the following description, the demodulation signals are simply referred to as demodulation signal X and demodulation signal Y.

The head position demodulator 48 receives the demodulation signals X, Y demodulated by the area demodulator 46, and outputs a phase angle θ indicating the direction of the vector formed in a phase plane by the demodulation signals X, Y as the head position signal.

In the demodulation of the phase angle by the head position demodulator 48, the phase angle θ is calculated by substituting the demodulation signals X, Y for the following arctangent function, and the resultant is output as the head position signal.

$$\theta = \tan^{-1}(Y/X) \tag{1}$$

With respect to the calculation of the arctangent function for obtaining the phase angle θ from Equation 1, the bivariate arctangent function in C-language known as "atan2" may be executed by the MPU 26.

The arctangent function can calculate the arctangent of the two variables X and Y, where the ratio (Y/X) of the variables is an argument in calculating the arctangent, and an angle between −π and +π (comprise both ends) is returned in radian as a result. The quadrant of the result may be defined using the signs of the two arguments (X, Y) with respect to the result of the function, to thereby obtain the phase angle, which change is worth two tracks, in the range of between 0° and 360°.

However, position linearity is not sufficiently obtained even if the phase angle is calculated by the atan2 function with the ratio (Y/X) of the two demodulation signals obtained from the area demodulator 46 as the argument.

In the embodiment, the MPU 26 comprises a function correction module 52 to correct the arctangent function used in the head position demodulator 48.

The correction of the arctangent function by the function correction module 52 ensures position linearity by performing seeking at a constant speed for every head 22-1 to 22-4, sampling and holding the demodulation signals X, Y from the area demodulator 46, generating a position litharge by a plurality of sampled and held modulation signals X, Y, actually measuring the probability density of the generated position litharge and obtaining the cumulative probability density curve as a corrected arctangent function, and correcting the arctangent so that the probability density of the position litharge consequently becomes constant.

Figure 2A:
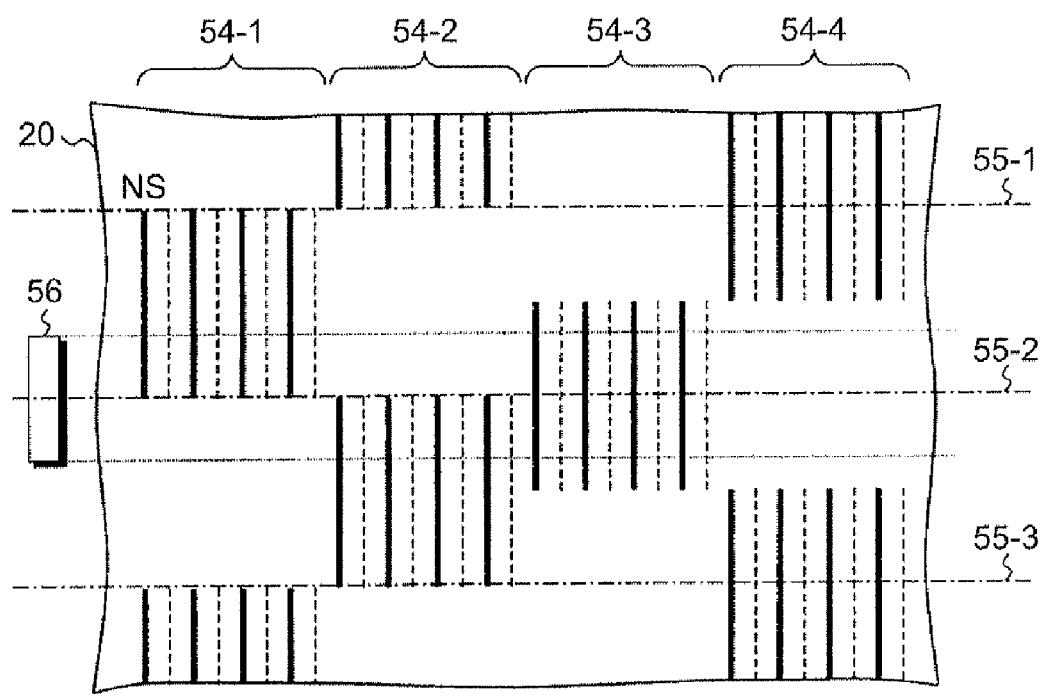
FIGS. 2A and 2B are exemplary schematic diagrams for explaining an area demodulation pattern and a demodulation signal in the embodiment.
Figure 2B:
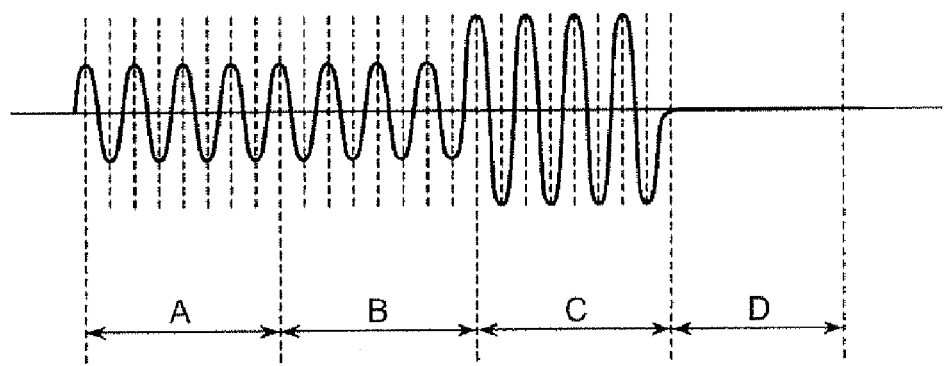

FIGS. 2A and 2B are schematic diagram for explaining the area demodulation pattern recorded on the magnetic disc and the demodulation signal in the embodiment. FIG. 2A illustrates an area demodulation pattern recorded on a servo frame of the magnetic disc 20, where the area demodulation patterns 54-1, 54-2, 54-3, 54-4 are recorded for a predetermined cycle of an N pole indicated with a solid line and an S pole indicated with a dotted line in the track direction while being shifted by a predetermined pitch in a radial direction orthogonal to the track.

Specifically, with respect to the area demodulation pattern 54-1, the next area demodulation pattern 54-2 is shifted in the radial direction by one track pitch, the area demodulation pattern 54-3 is shifted in the radial direction by ½ track pitch, and the following area demodulation pattern 54-4 is shifted in the radial direction by one track pitch with respect thereto, which shifting is repeated in the track direction.

Three track centers 55-1, 55-2, 55-3 exist in the magnetic disc 20 recorded with such area demodulation patterns 54-1 to 54-4 in this case, and a state in which a read head 56 is on-track controlled on the track center 55-2 is currently illustrated.

FIG. 2B is a timing chart of the read signal of the area demodulation pattern obtained from the read head 56 of FIG. 2A. The read signal has half of the read core width for the area demodulation patterns 54-1, 54-2 positioned with respect to the read head 56, and thus a waveform which amplitude corresponding thereto is one half of the peak value is obtained.

With respect to the next area demodulation pattern 54-3, a waveform with a maximum amplitude is obtained as the read head 56 overlaps the pattern, and with respect to the following area demodulation pattern 54-4, the read waveform is zero as the read head 56 is not positioned.

With respect to the read signal of FIG. 2B, the area demodulator 46 obtains the demodulation signals X, Y with Equations as follows:

$$X = A - B$$

$$Y = C - D$$

where A, B, C, and D are read signals of intervals corresponding to the area demodulation patterns 54-1 to 54-4.

Here, since the read head 56 of FIG. 2A is positioned on the track center 55-2, if the maximum amplitude of the read signal of FIG. 2B is 100, the demodulation is carried out as follows:

$$X = A - B = 50 - 50 = 0$$

$$Y = C - D = 100 - 0 = 100$$

Figure 3A:
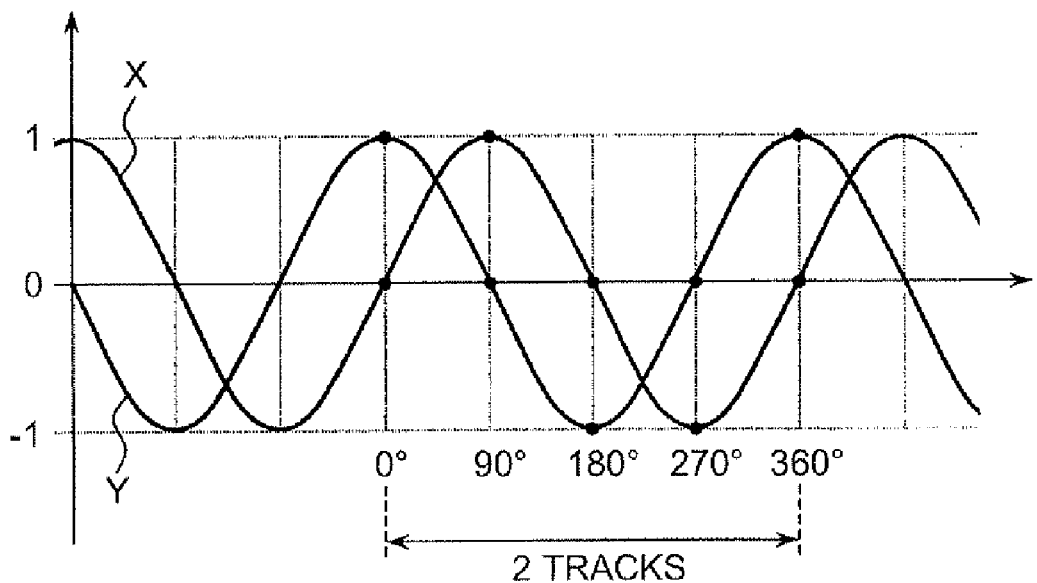
FIGS. 3A and 3B are an exemplary timing chart of demodulation signals X, Y obtained when a head is moved at a constant speed and a schematic diagrams for explaining the vector of the phase plane in the embodiment.
Figure 3B:
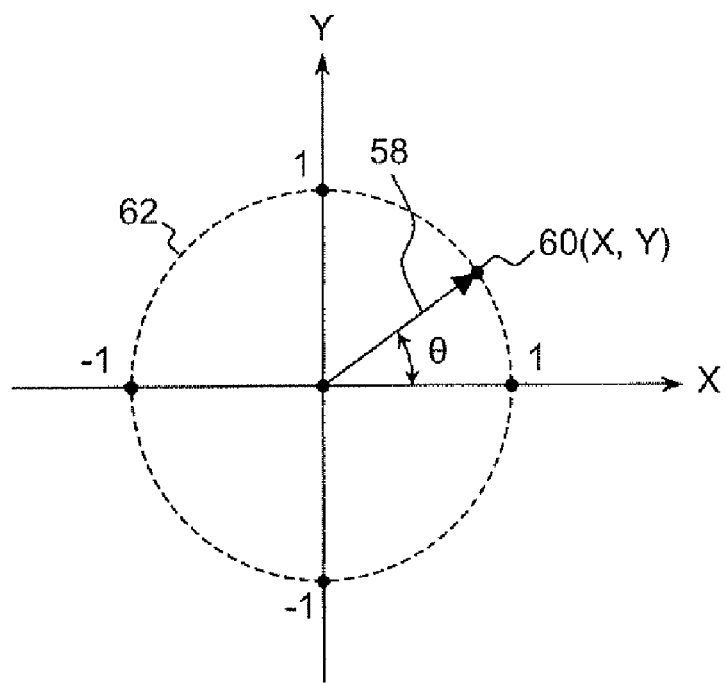

FIGS. 3A and 3B are a timing chart of the demodulation signals X, Y obtained when the head is moved at a constant speed in a direction transversing the track and a schematic diagram for explaining the vector of the phase plane, respectively, in the embodiment.

FIG. 3A illustrates the demodulation signals X, Y obtained when the head is moved at a constant speed, where the demodulation signal Y has a phase difference of 90° with respect to the demodulation signal X. The demodulation signals X, Y demodulated from the read signal of FIG. 2B obtained in a state the read head 56 is positioned on the track center 55-2 illustrated in FIG. 2A are signals indicating the position of X=0, Y=1 at a phase angle of θ=0° illustrated on the horizontal axis.

FIG. 3B illustrates a vector formed in the phase space by the demodulation signals X, Y of FIG. 3A. In the phase space of FIG. 3B, a vertex 60 of a vector 58 is obtained by plotting the modulation signal (X, Y) sampled at an arbitrary timing of FIG. 3A in the phase space.

The vector 58 rotates in a counterclockwise direction on a circle depicted with a broken line with the change of when the head is moved at a constant speed in the radial direction as illustrated in FIG. 3A. The trajectory of a circle 62 drawn by the vertex 60 of the vector 58 becomes the position litharge obtained by sampling and holding the modulation signals X, Y obtained by moving the head in the radial direction, and plotting the sampled and held result on a two-phase plane.

In regards to the position litharge, when the demodulation signals X, Y have a sine waveform as in FIG. 3A, the litharge waveform of FIG. 3B draws the circle 62. However, with the actually obtained demodulation signals X, Y, the sine waveform as in FIG. 3A is not obtained and the peak portion saturates and distorts, whereby the litharge waveform of FIG. 3B does not become the circle 62 illustrated with a broken line but deforms to a rectangular shape with an earl at the corner portion.

FIG. 4 is a functional block diagram of the function correction module 52 arranged in the MPU 26. As illustrated in FIG. 4, the function correction module 52 comprises a measurement holding module 64, a litharge generator 65, a probability density measuring module 66, a correction function generator 68, and a work memory 70.

The measurement holding module 64 holds a set of demodulation signals X, Y output from the area demodulator 46 when the head is moved in a direction transversing the track in the work memory 70 as a measurement point.

The litharge generator 65 sets the measurement point held in the work memory 70 in the phase plane as illustrated in FIG. 3B and generates the position litharge.

The probability density measuring module 66 divides the zone in which the ratio (|Y|/|X|) of the absolute values of the demodulation signals X, Y providing the measurement point in the generated position litharge or the inverse number thereof (|X|/|Y|) changes from zero to one by a predetermined number such as eight, and measures the histogram indicating the number of measurement points for every divided zone as a probability density.

The correction function generator 68 obtains the cumulative probability density where the probability density of each divided zone is sequentially cumulated for the zone in which the ratio (|Y|/|X|) of the absolute values of the demodulation signals X, Y or the inverse number thereof (|X|/|Y|) changes from zero to one, and sets the cumulative probability density curve in a correction function conversion table 50 of the memory 30 as the corrected arctangent function so that the correction function conversion table 50 can be used by the head position demodulator 48 of the MPU 26.

Figure 5:
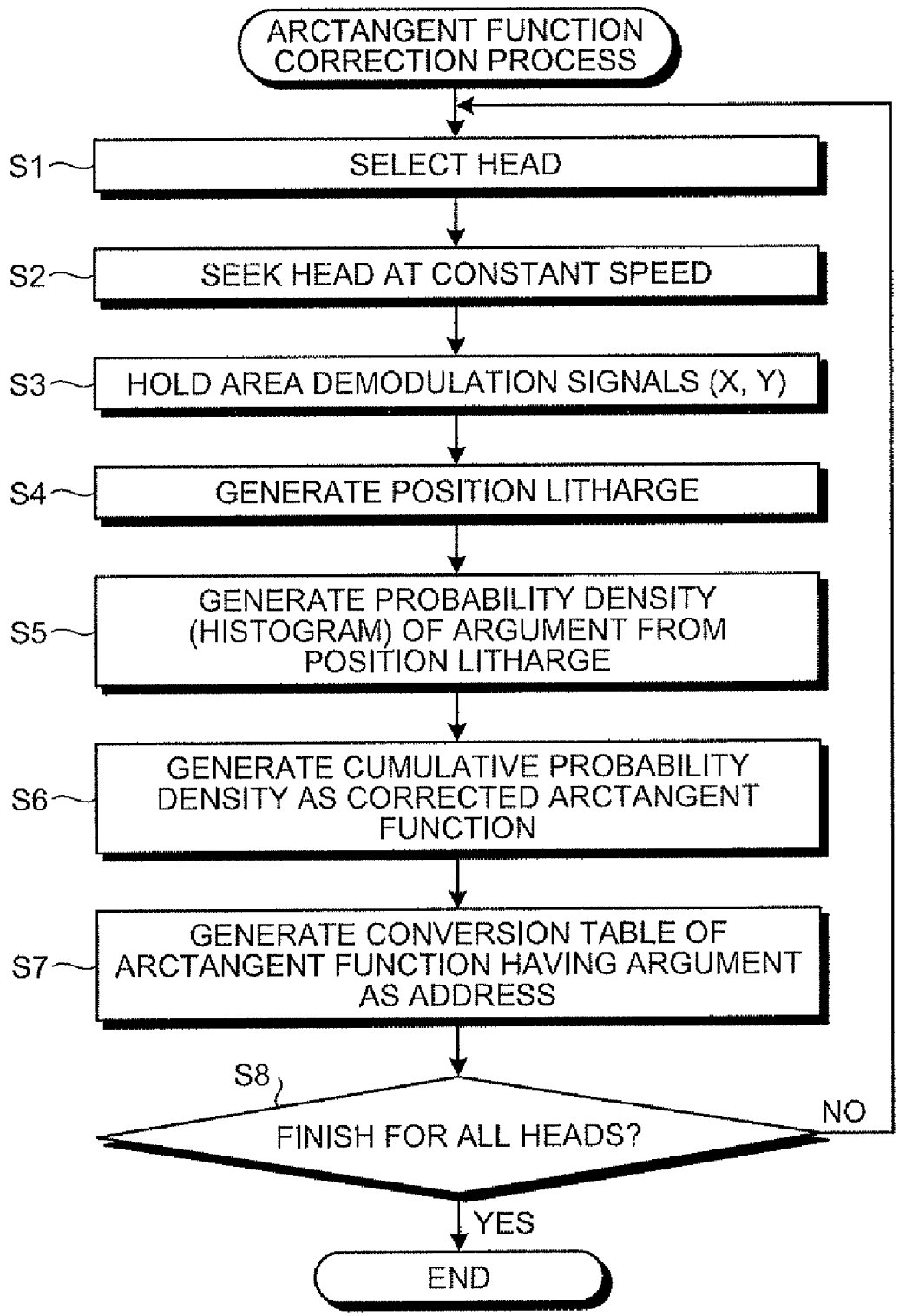
FIG. 5 is an exemplary flowchart of an arctangent function correction process in the embodiment.

FIG. 5 is a flowchart of an arctangent function correction process in the embodiment. As illustrated in FIG. 5, a specific head is first selected (S1), and the head is sought at a constant speed from the most inner side towards the most outer side (S2).

The demodulation signals (X, Y) from the area demodulator 46 obtained during the seeking of the head are sampled and held at regular intervals by an AD converter in (S3). After the sampling and holding of the demodulation signal are completed at S3, the position litharge is generated by plotting the measurement points on the phase plane based on the held demodulation signals (X, Y) in (S4).

The probability density (histogram) is then generated from the position litharge (S5). The arctangent function corrected based on the cumulative probability density is generated (S6). The conversion table of the corrected arctangent function having the ratio that changes in the range of between zero and one obtained from the ratio (|Y|/|X|) of the absolute values of the demodulation signal or the inverse number thereof (|X|/|Y|) as the address, i.e., the correction function conversion table 50 of the memory 30 is generated (S7).

Whether or not the processes of all heads are finished is checked (S8). If not, the process returns to S1 to select the next head, and the same processes are repeated until the processes of all heads are finished.

Figure 6:
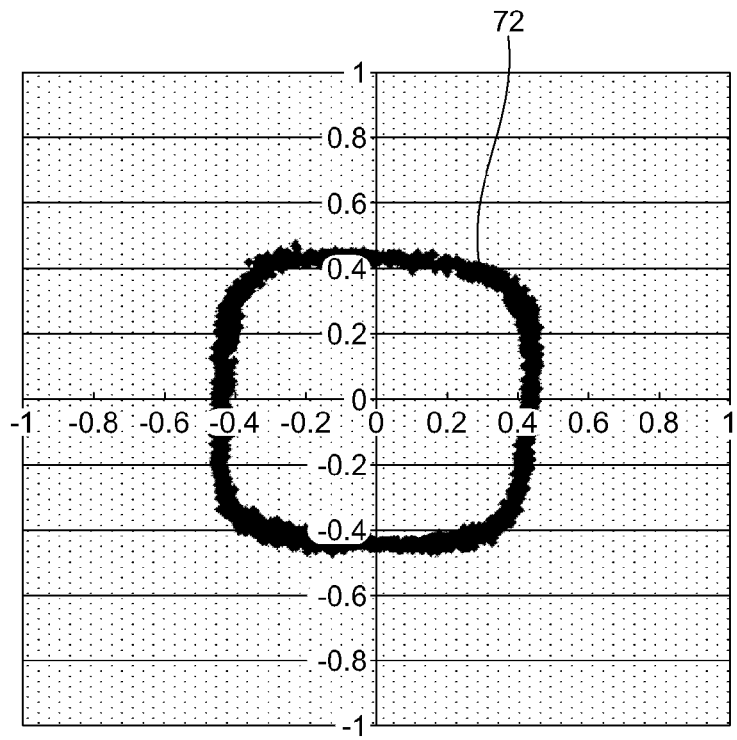
FIG. 6 is an exemplary explanatory view of a position litharge measured with a head where the track boundary is easy to view in the embodiment.

FIG. 6 is an explanatory view of the position litharge measured from the demodulation signal involved in the constant speed seek of the head in the arctangent function correction process of FIG. 5.

A position litharge measured with a head where the track boundary is easy to view is given by way of example for the position litharge 72. The head where the track boundary is easy to view indicates the case where the waveform is saturated flat at the peak position of 1, −1 of the demodulation signals X, Y illustrated in FIG. 3A.

When the demodulation signals X, Y are saturated flat at the peak position, the litharge waveform becomes flat at orthogonal positions of 0°, 90°, 180°, and 270°, and is rounded at the corner portion in the 45° direction.

Figure 7:
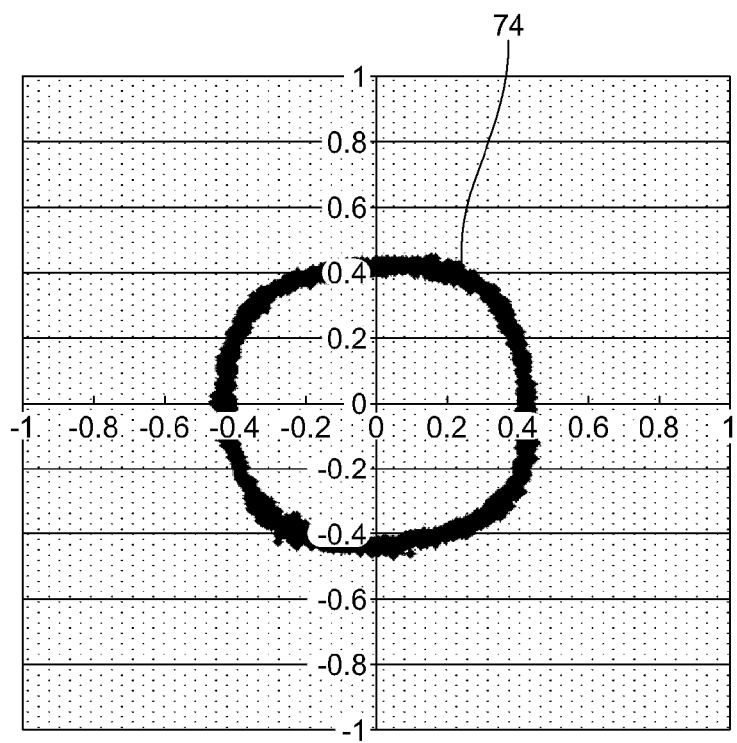
FIG. 7 is an exemplary explanatory view of a position litharge measured with a head where the track boundary is difficult to view in the embodiment.

FIG. 7 is an explanatory view of the position litharge measured with a head where the track boundary is difficult to view. The position litharge 74 of FIG. 7 relatively has a waveform close to a sine wave in which the demodulation signals X, Y of FIG. 3A are smooth at the peak portion, and thus the waveform in the orthogonal direction of 0°, 90°, 180°, and 270° is round compared to the position litharge 72 where the head boundary is easy to view of FIG. 6.

The litharge waveforms differ because the area demodulation patterns are recorded on the magnetic disc at the same track pitch by the servo track writer for all heads although the dimension of the read core differs for every head.

Figure 8:
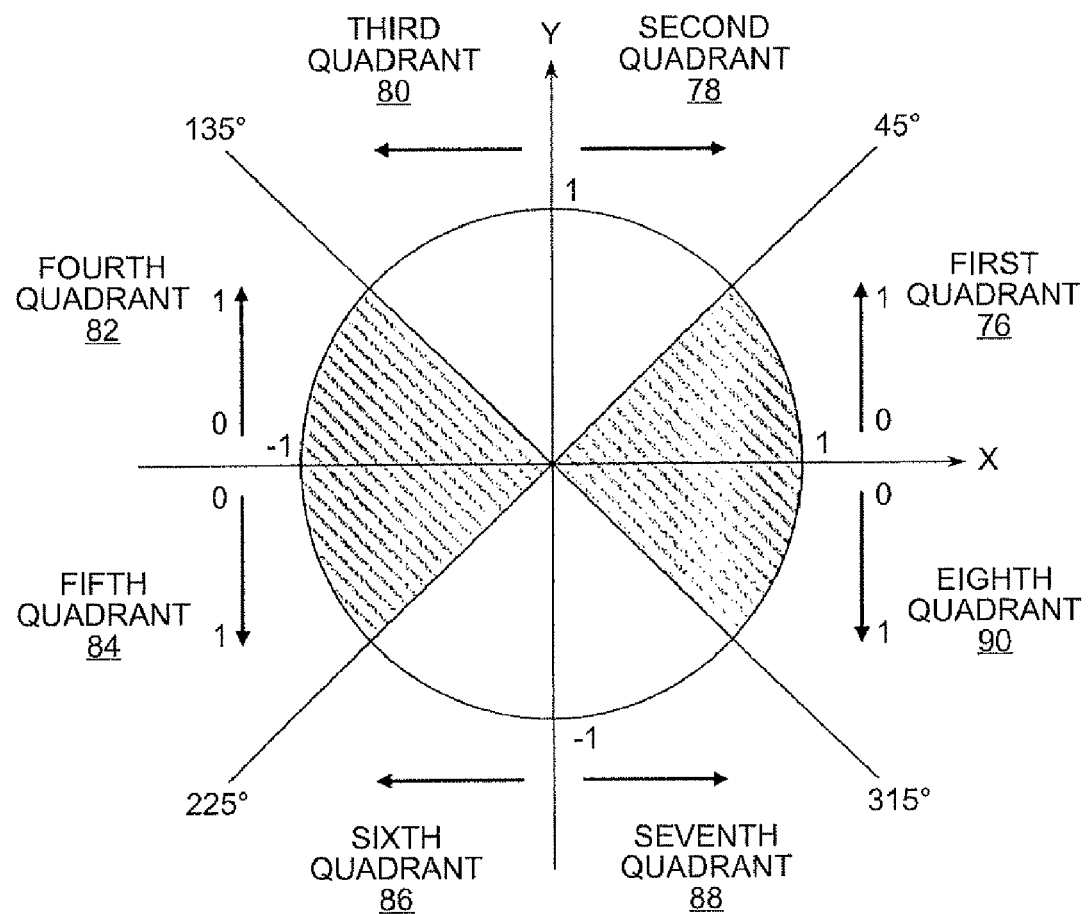
FIG. 8 is an exemplary schematic diagram for explaining a quadrant in which the ratio (Y/X) of a demodulation signal changes from zero to one in the embodiment.

FIG. 8 is a schematic diagram for explaining a quadrant of a phase plane in which (|Y|/|X|), i.e., the ratio R of the overall value of the demodulation signal, or the inverse number thereof (|X|/|Y|) changes from zero to one upon measurement of the probability density of the position litharge 72, 74 illustrated in FIGS. 6 and 7.

In FIG. 8, the phase plane is divided into eight quadrants of a first quadrant 76, a second quadrant 78, a third quadrant 80, a fourth quadrant 82, a fifth quadrant 84, a sixth quadrant 86, a seventh quadrant 88, and an eighth quadrant 90 in the counterclockwise direction at an interval of 45°.

The quadrant in which the ratio R=|Y|/|X| of the absolute values of the demodulation signals change from zero to one comprises four quadrants, the first quadrant 76, the eighth quadrant 90 that becomes a symmetrical position thereof, the fourth quadrant 82, and the fifth quadrant 84 that becomes a symmetrical position thereof, which are illustrated with diagonal lines. For example, taking the first quadrant 76 as an example, (X,Y)=(1,0) at the phase angle θ=0°, and thus the ratio in this case is R=0. When θ=45° from such position, (X,Y)=(1/√2,1/√2) and the ratio is R=1. With respect to the first quadrant 76, the changing direction of the ratio zero to one is illustrated with an arrow.

When the ratio R=(Y/X) is obtained similarly for the absolute values of the demodulation signals X, Y with respect to the eighth quadrant 90 that is a symmetric position of the first quadrant 76 with respect to the X axis, the ratio R changes from zero to one in the range of between 0° and 315°, and the changing direction is the opposite direction with respect to the first quadrant 76 illustrated with an arrow.

This relationship is similar in the fourth quadrant 82 and the fifth quadrant 84. In other words, the ratio R=(Y/X) of the absolute values of the demodulation signals X, Y all changes from zero to one for the first quadrant 76, the eighth quadrant 90, the fourth quadrant 82, and the fifth quadrant 84.

Figure 9:
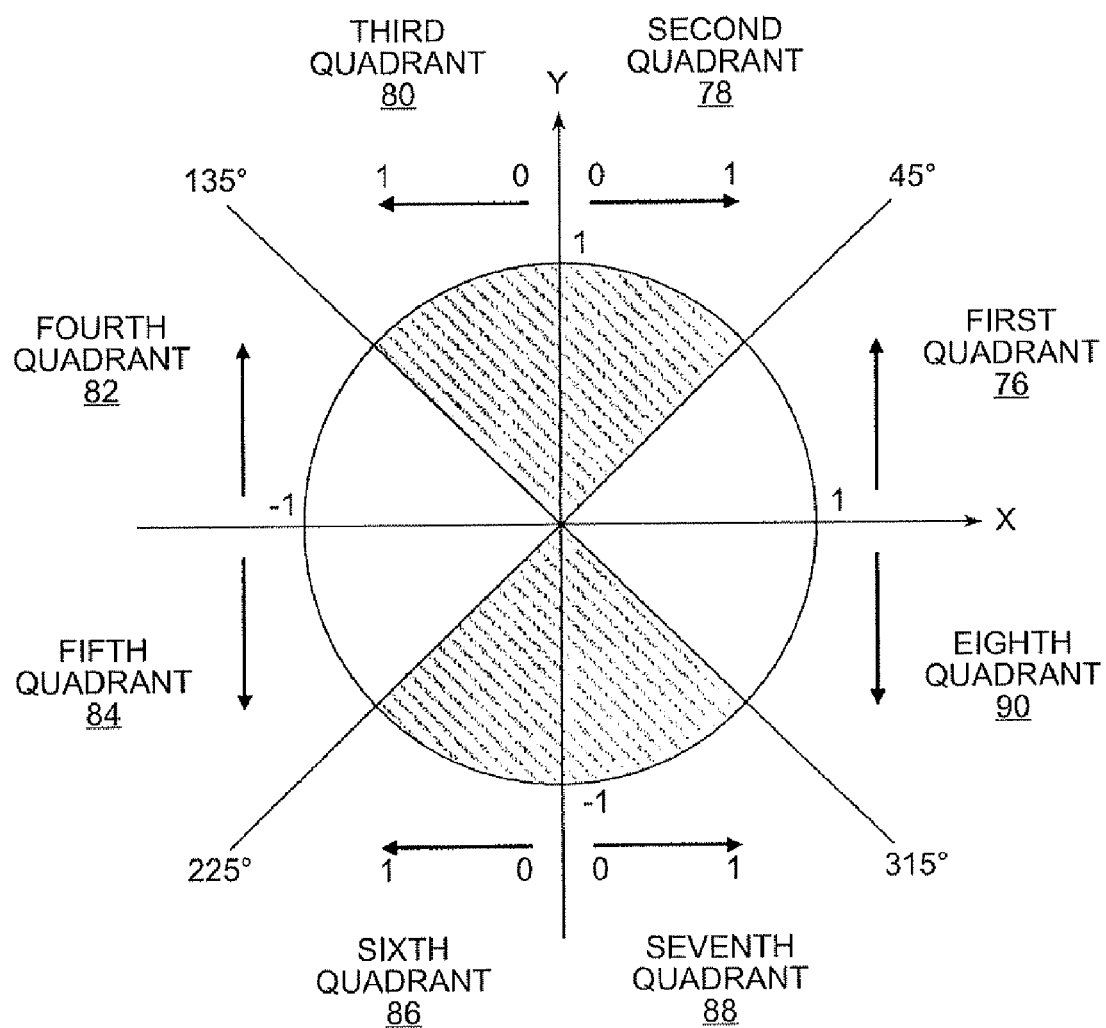
FIG. 9 is an exemplary schematic diagram for explaining a quadrant in which the ratio (X/Y) of a demodulation signal changes from zero to one in the embodiment.

FIG. 9 illustrates the quadrants in which the inverse number (|X|/|Y|) of the ratio R of the absolute values of the demodulation signals changes from zero to one. The quadrant in which the inverse number (|X|/|Y|) of the ratio R of the absolute values of the demodulation signals changes from zero to one is the fourth quadrants, the second quadrant 78, the third quadrant 80, the sixth quadrant 86, and the seventh quadrant 88 illustrated with diagonal lines.

Taking the second quadrant 78 as an example, (X,Y)=(0,1) at the phase angle θ=90°, and thus the ratio in this case is R=0. When the phase angle θ changes from 90° to 45° and becomes θ=45°, the ratio is R=1. The changing direction of the ratio zero to one in this case is the clockwise direction as illustrated with an arrow.

With respect to the third quadrant 80, the ratio changes from zero to one in the opposite direction to the second quadrant 78. The relationship of the second quadrant and the third quadrant 80 is similar in the sixth quadrant 86 and the seventh quadrant 88 that are symmetric positions with respect to the Y axis.

Therefore, the second quadrant 78, the third quadrant 80, the sixth quadrant 86, and the seventh quadrant 88 are quadrants in which the inverse number (|X|/|Y|) of the ratio R of the absolute values of the demodulation signals changes from zero to one in the same manner.

With respect to the eight quadrants in which the ratio R of the absolute values of the demodulation signals or the inverse number thereof, the change in ratio from zero to one in each quadrant is divided into eight zones, and the number of measurement points belonging to each divided zone is counted to create a histogram with the position litharge 72 or 74 illustrated in FIG. 6 or 7 as the target for each of the eight divided zones so that the relevant histogram can be obtained as the probability density of the position litharge.

In the following, the ratio R of the absolute values of the demodulation signals or the inverse number thereof is simply described as ratio R.

FIG. 10 illustrates an example of a work table 92 indicating, by dividing the ratio of zero to one into eight zones for the eight quadrants of FIGS. 8 and 9, the probability density of each divided zone and the total sum thereof. The work table 92 may be obtained as the actual measurement result.

In the work table 92 of FIG. 10, the ratio R that becomes zero to one is divided to eight zones and such zones are illustrated on the upper column, and the first quadrant to the eighth quadrant in which the phase plane is divided in units of 45° are illustrated in the vertical direction on the left side. The ratio is calculated from the demodulation signals X, Y of the measurement point for each of the first quadrant to the eighth quadrant with respect to the position litharge, the number of counts of the divided zone to which the calculated ratio belongs is added, and the total sum of all divided zones for the first quadrant to the eighth quadrant is obtained as total value N1 to N8 as illustrated on the lowermost column.

Here, the work table 92 illustrates the content of dividing the ratio of zero to one into eight zones for the eight quadrants of FIGS. 8 and 9 and measuring the number of measurement points from the litharge waveform in an easily understandable manner, but actually, with respect to the measurement point (X, Y) measured to draw the position litharge, the ratio of the absolute values or the inverse number thereof is calculated according to the first to the eighth quadrants, and to which of the eight zones of the work table 92 the calculated ratio or the inverse number belongs is determined, and the number of counts of the zone to which the calculated ratio or the inverse number belongs is summed, whereby the work table 92 as illustrated in FIG. 10 may not necessarily be created.

Figure 11:
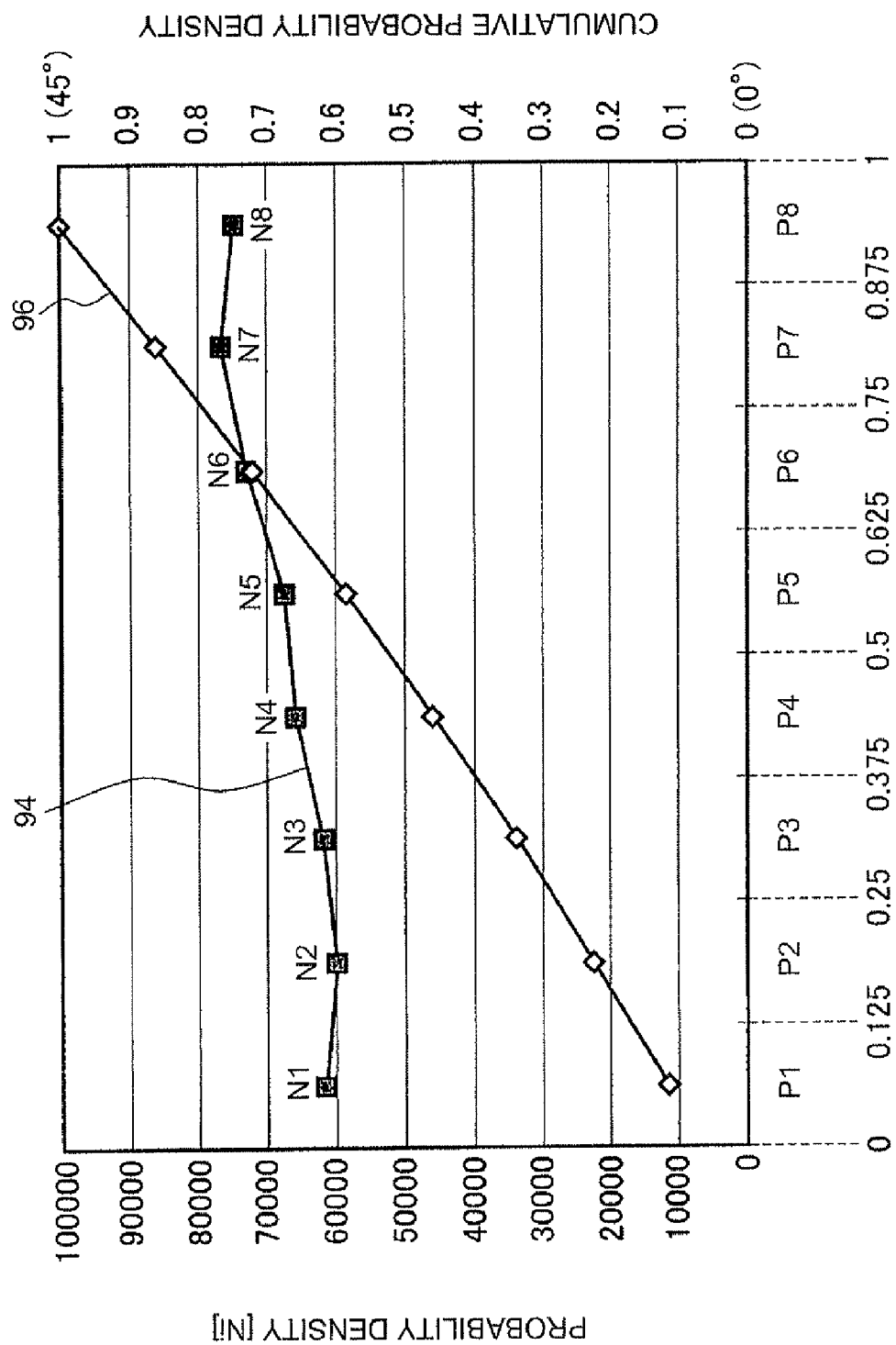
FIG. 11 is an exemplary graph of the probability density generated from the position litharge of FIG. 6 and the cumulative density in the embodiment.

FIG. 11 is a graph of the probability density generated from the position litharge 72 of FIG. 6 and the cumulative density. In FIG. 11, the horizontal axis is the ratio R of the demodulation signals that changes from zero to one, where the zone of zero to one is divided into eight divided zones P1 to P8, and the number of measurement points N1 to N8 in each zone is plotted as the probability density to obtain a probability density curve 94.

If such probability density curve 94 is generated from the litharge waveform, a cumulative probability density curves 96 is generated by sequentially cumulating the probability densities N1 to N8 in the order of the divided zone P1 to P8.

The cumulative probability density curve 96 takes the value of the normalized cumulative probability density zero to one illustrated on the right side by dividing the cumulative number in each zone by the total number. The cumulative probability density curve 96 obtained in such manner provides a function in which the arctangent function obtained from the actual measurement result of the litharge waveform is corrected.

Therefore, the correction function conversion table 50 can be generated by storing the coefficient having the value of between zero to one based on the cumulative probability density curve 96 with the ratio R of the absolute values of the demodulation signals X, Y that changes from zero to one based on the cumulative probability density curve 96 of FIG. 11 as the address.

Specifically, as the cumulative probability density that changes from zero to one corresponds to 0° to 45° in phase angle, the correction function conversion table 50 storing the phase angle 0° to 45° obtained according to the cumulative probability density curve 96 with the ratio R=0 to 1 of the demodulation signals X, Y as the address merely needs to be generated.

Figure 12:
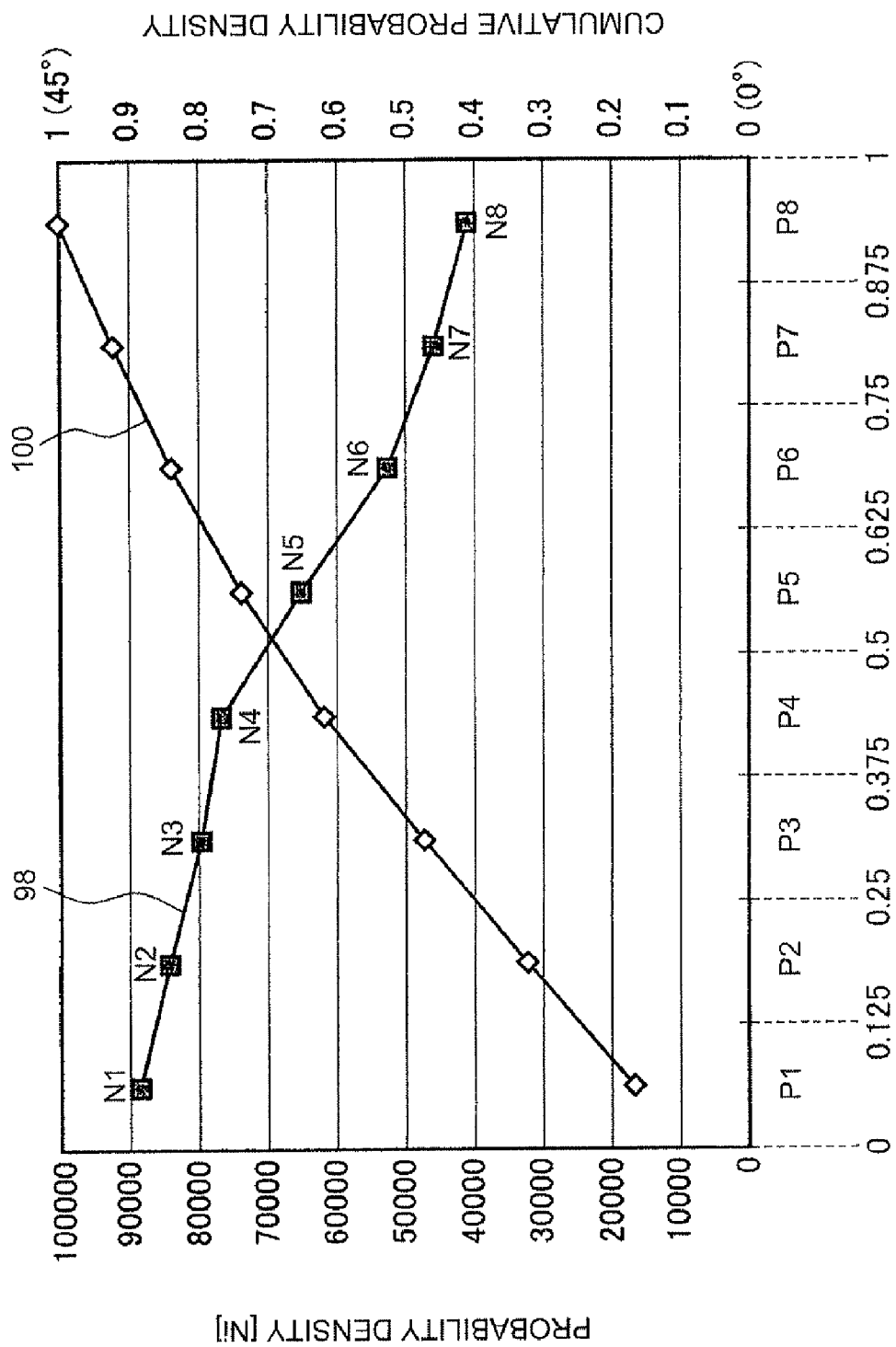
FIG. 12 is an exemplary graph of the probability density generated from the position litharge of FIG. 7 and the cumulative density in the embodiment.

FIG. 12 is a graph of the probability density generated from the position litharge 74 of FIG. 7 and the cumulative density. Similarly in this case, the number of measurement points, i.e., the probability densities N1 to N8 of the ratio contained in the divided zone are obtained from the litharge waveform and then plotted for the divided zones P1 to P8 in which the range of the ratio R of zero to one of the absolute values of the demodulation signals X, Y illustrated on the horizontal axis is divided into eight zones, to thereby obtain a probability density curve 98.

A cumulative probability density curve 100 is then generated by cumulating the probability densities in order of the divided zones P1 to P8 based on the probability density curve 98, and the correction function conversion table 50 is generated with such curve as the corrected arctangent function.

In this case as well, since the cumulative probability density take a normalized value of between zero and one, similar to FIG. 1, this may be registered in the conversion table as 0° to 45° corresponding to the actual phase angle.

Comparing the cumulative probability density curves 96 and 100 of FIGS. 11 and 12, the cumulative probability density curves 96 has a property of being slightly curved downward. The cumulative probability density curve 100 of FIG. 12, on the other hand, is an upwardly curved curve, which upwardly curved curve is a shape close to the curve of the arctangent function.

In other words, the position litharge 74 of FIG. 7 is close to a circular position litharge by the arctangent function, and thus the cumulative probability density curve 100 serving as the corrected arctangent function of FIG. 12 is close thereto; whereas the position litharge 72 close to a rectangle of FIG. 6 is a downwardly curved curve as in the cumulative probability density curves 96 of FIG. 11 and the degree of correction with respect to the curve of the arctangent function before correction is large.

The function correction module 52 arranged in the MPU 26 has a function performed as calibration at the final step in manufacturing the magnetic disc device 10. As the function correction module 52 is not necessary when the arctangent function correction process illustrated in FIG. 5 is finished by the function correction module 52 and the correction function conversion table 50 is formed in the memory 30, and the write and save process to the system region of either magnetic disc 20-1, 20-2 is terminated, the program for implementing the function correction module 52 is deleted from the magnetic disc device 10.

It can be recognized that the magnetic disc device 10 may be factory shipped with the function of the function correction module 52 mounted thereon, and the correction process by the function correction module 52 may be performed as calibration, as necessary, on the user side.

Figure 13:
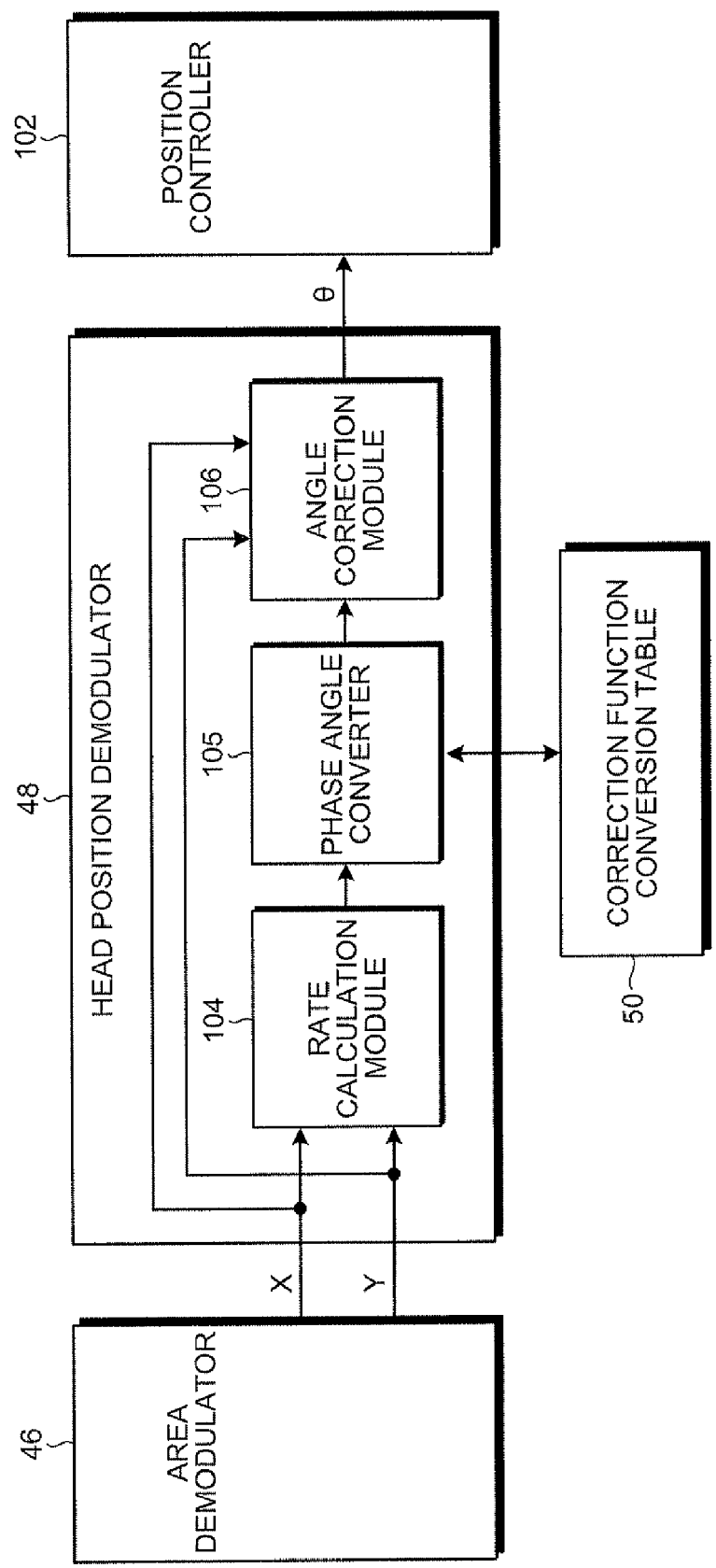
FIG. 13 is an exemplary functional block diagram of the head position demodulator in the embodiment.

FIG. 13 is a functional block diagram of the head position demodulator 48 in the MPU 26. As illustrated in FIG. 13, the head position demodulator 48 comprises a rate calculation module 104, a phase angle converter 105, and an angle correction module 106. The rate calculation module 104 calculates the ratio (|Y|/|X|) or (|X|/|Y|) of the absolute values of the demodulation signals X, Y obtained from the area demodulator 46.

The ratio R calculated by the rate calculation module 104 is output to the phase angle converter 105. The phase angle converter 105 references the correction function conversion table 50 with the ratio (|Y|/|X|) or (|X|/|Y|) of the absolute values of the demodulation signals X, Y that changes in the range of zero to one as the address, and outputs the corresponding phase angle θ.

The correction function conversion table 50 registers the phase angle of 0° to 45° based on the cumulative probability density curves 96, 100 obtained from the position litharge for every head of FIG. 11 or 12, where when the ratio (|Y|/|X|) or (|X|/|Y|) is input, the phase angle θ corresponding thereto is output.

The angle correction module 106 determines to which one of the first quadrant to the eighth quadrant of the phase plane illustrated in FIGS. 8 and 9 the measurement point belongs from the signs of the demodulation signals X, Y and the comparison of the magnitude of the absolute values, corrects the phase angle θ obtained from the correction function conversion table 50 by addition or subtraction of a predetermined value corresponding to the determined quadrant, and outputs the phase angle θ that changes in the range of between 0° and 360° in units of two tracks to a position controller 102.

The position controller 102 performs a seek control of moving the head to the target track based on the head position signal provided as the phase angle θ, and an on-track control of after the head is sought to the target track.

Figure 14:
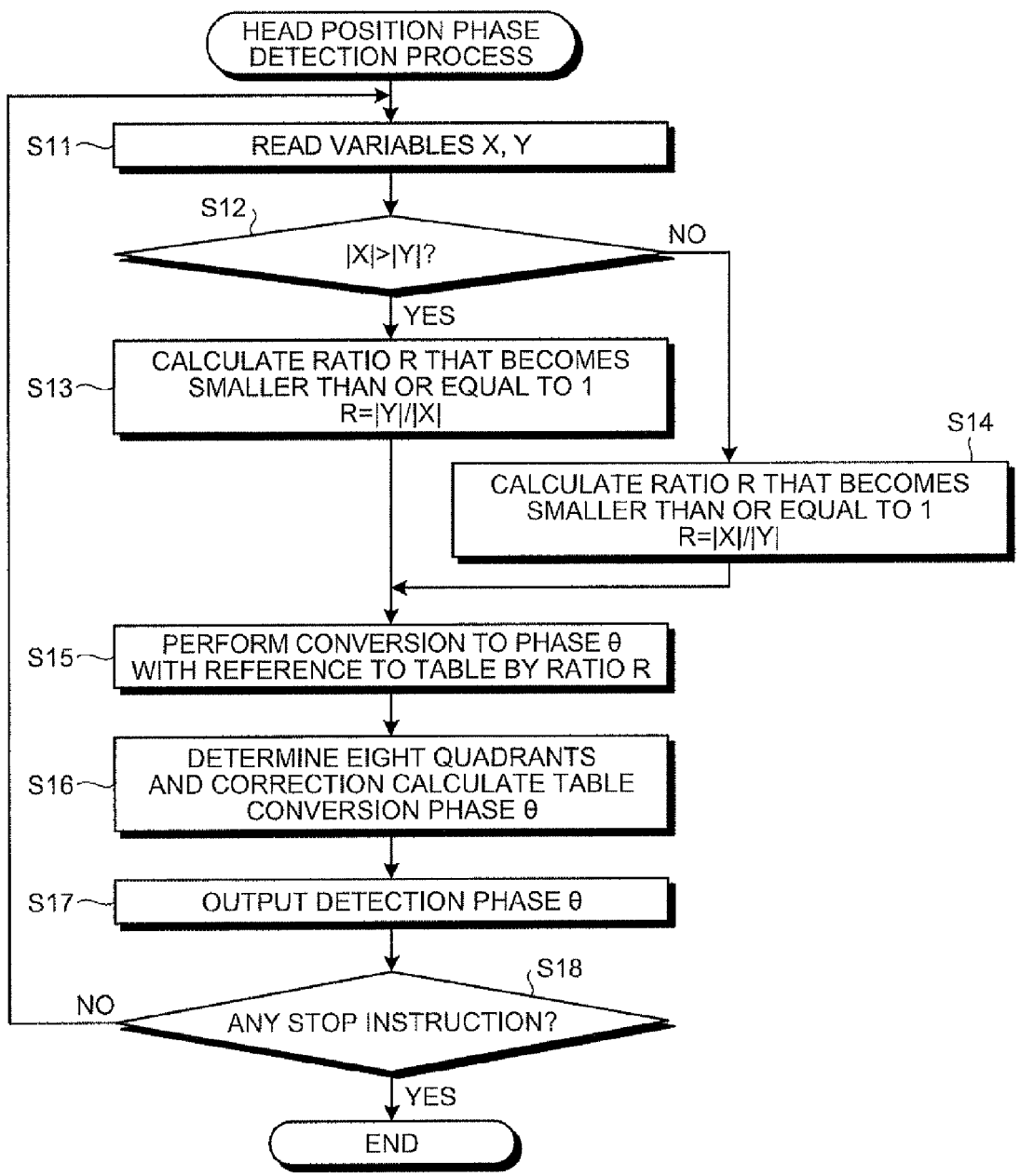
FIG. 14 is an exemplary flowchart of a head position detection process using a correction function conversion table in the embodiment.

FIG. 14 is a flowchart of a head position detection process using the correction function conversion table in the embodiment, which will be described later with reference to FIG. 13.

As illustrated in FIG. 14, the demodulation signals obtained from the area demodulator 46 are first read as variables X, Y (S11), and whether or not the magnitude relationship of the absolute values such as |X|>|Y| is met is determined (S12).

The process proceeds to S13 when it is determined that the magnitude relationship of S12 is met, and the ratio R that becomes smaller than or equal to one is calculated by R=|Y|/|X|.

The process proceeds to S14 when it is determined that the magnitude relationship of S12 is not met, and the ratio R that becomes smaller than or equal to one is also calculated by R=|Y|/|X|.

At S15, it is converted to the phase angle θ with reference to the correction function conversion table 50 by the ratio R. At S16, to which one of the first quadrant to the eighth quadrant the measurement point belongs is determined from the sign of the variables X, Y and the magnitude relationship of the absolute values by the angle correction module 106, and the table conversion phase θ is correction calculated.

At S17, the detected phase, which is already subjected to the correction calculation, is output to the position controller 102 to perform the seek control with respect to the target track or the on-track control with respect to the track center. The processes from S11 to S17 are repeated until a stop instruction such as log off is made (S18).

FIG. 15 illustrates an example of a correction calculation table 108 indicating the correction calculation of the phase angle based on the quadrant determination result of the angle correction module 106, i.e., S16 in FIG. 14.

In the correction calculation table 108 of FIG. 15, the calculation content of the correction calculation is set for each of the first quadrant to the eighth quadrant. The content of the correction calculation is the correction calculation complying with the arrow indicating the direction the ratio R of the quadrant to which the measurement point defined by the variables X, Y illustrated in FIGS. 8 and 9 belongs changes from zero to one.

For example, in the first quadrant 76 of FIG. 8, since the change of the ration from zero to one corresponds to 0° to 45°, the correction calculation outputs (0°+θ), i.e., the table conversion phase θ as is.

In the second quadrant 78 of FIG. 9, on the other hand, the correction calculation is (90°−θ) since the change of ration from zero to one is the change of between 90° and 45° in the phase angle θ.

In the third quadrant 80, the fourth quadrant 82, the fifth quadrant 84, the sixth quadrant 86, the seventh quadrant 88, and the eighth quadrant 90 as well, the correction calculation is set so as to be the angle in the direction of the arrow indicating the changing direction of the ratio from zero to one.

FIG. 16 illustrates an example of a quadrant determination table 110 for determining the quadrant to which the measurement point of the variables X, Y of the angle correction module 106 and S16 of FIG. 14 belongs. In the quadrant determination table 110 of FIG. 16, the quadrant to which the measurement point belongs is determined by the magnitude relationship of the absolute values of the variables X, Y and the sign of the variables X, Y.

Taking the first quadrant and the second quadrant as examples, the signs of the variables X, Y in the first quadrant 76 and the second quadrant 78 are both (+, +) but the magnitude relationship of the variables X, Y differs in the first quadrant 76 and the second quadrant 78, as apparent from FIGS. 8 and 9.

In other words, the variable X is greater than the variable Y in the first quadrant, whereas the variable X is smaller than the variable Y in the second quadrant. Therefore, to which one of the first quadrant to the eighth quadrant it belongs can be determined by the magnitude relationship of the absolute values of the variables X, Y and the respective signs.

Once the determination result of the quadrant determination table 110 is obtained, the content of the correction calculation is determined by specifying the quadrant of the correction calculation table 108.

FIG. 17 illustrates an example of the correction function conversion table 50 generated from the cumulative probability density curves 96 of FIG. 11. In the correction function conversion table 50 of FIG. 17, the ratio R is divided into eight zones for the range of zero to one and set as an address value, and the normalized value of between zero and one obtained from the cumulative probability density curves 96 with respect to the ratio R divided into eight zones is stored.

In the actual correction function conversion table 50, the normalized value is unnecessary, and the value of the phase angle θ obtained by multiplying 45° to the normalized value is registered. The correction function conversion table 50 has a resolution in which the ratio R is divided into eight zones, where the phase angle θ for the ratio in between is obtained through interpolation calculation.

FIG. 18 illustrates an example of the non-corrected arctangent function conversion table. In an arctangent function conversion table 112 of FIG. 18, the zero to one zone of the ratio R is divided into eight zones and the phase angle θ corresponding to the respective ratio is obtained from Equation 1 and stored, same as the correction function conversion table 50 of FIG. 17.

In the case of using the non-corrected arctangent function conversion table 112 as well, the head position detection process by FIGS. 13 and 14 can be similarly performed, similar to the case of the correction function conversion table 50 of FIG. 17. In other words, the correction function conversion table 50 of FIG. 13 is replaced with the non-corrected arctangent function conversion table 112 of FIG. 18.

FIG. 19 is a graph of the actual measurement result of non-repeatable run-out (NRRO) in units of servo frames obtained from the head position in the on-track control state using the correction function conversion table 50 in FIG. 17 and the non-corrected arctangent function conversion table 112 in FIG. 18.

In FIG. 19, the horizontal axis indicates the servo frame number, and the vertical axis indicates the phase angle obtained from the conversion table in radian. In FIG. 19, an NRRO measurement result 116 is for the case in which the phase angle is obtained using the non-corrected arctangent function conversion table, where σ1 of NRRO varies in the range of between σ1=0.06 radian to 0.14 radian.

In contrast, when the arctangent function is corrected by actually measuring the probability density of the position litharge and obtaining the cumulative probability density curve, σ2 falls in the range of between 0.08 radian and 0.12 radian, as depicted with an NRRO measurement result 114, whereby variation after correction can reduced to half compared to before correction, and the position linearity by correction can be sufficiently enhanced.

A computer program may be executed on a computer (by the MPU 26) to realize the same function as the magnetic disc device 10. That is, the computer program may implement the arctangent correction function process and the head position detection process described above in connection with FIGS. 5 and 14, respectively.

As set forth hereinabove, according to an embodiment of the invention, the phase angle or the direction of the vector is demodulated instead of the length of the vector formed in a phase space by two types of demodulation signals obtained in area demodulation. Accordingly, the crossover distortion at the track boundary that occurs in the conventional area demodulation is eliminated in principle. Thus, it is possible to detect the head position that linearly changes.

The arctangent function is used to calculate the phase of the vector. However, position linearity cannot be sufficiently obtained if used as is. Therefore, the probability density of the position litharge drawn as the vertex trajectory of the vector is actually measured for every head to obtain the corrected arctangent function for the cumulative density curve. With this, the arctangent function can be corrected such that the probability density on the litharge becomes constant and the position linearity can be ensured.

An considerable amount of correction calculation is necessary for the process of eliminating the crossover distortion or correcting the linearity in the conventional area demodulation. On the other hand, according to an embodiment of the invention, high position linearity can be ensured and the phase angle indicating the head position can be detected by using a conversion table of the corrected arctangent function obtained for every head from the probability density of the position litharge drawn by the vector defined by two types of demodulation signals obtained in area demodulation.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A storage device, comprising:
    an area demodulator configured to demodulate a first demodulation signal and a second demodulation signal having a phase difference of 90° from a read signal by a head of an area demodulation pattern recorded on a medium;
    a head position demodulator configured to receive the first demodulation signal and the second demodulation signal and output a phase angle indicating a direction of a vector formed in a phase plane by the first demodulation signal and the second demodulation signal as a head position signal; and
    a function correction module configured to correct an arctangent function set to the head position demodulator for each head,
    wherein the function correction module comprises:
    a measurement holding module configured to hold, as a measurement point, a set of the first demodulation signal and the second demodulation signal output from the area demodulator by moving the head in a direction transversing a track of the medium;
    a litharge generator configured to set the measurement point held in the measurement holding module on the phase plane and generate a position litharge;
    a probability density measuring module configured to divide a zone in which a ratio of the first demodulation signal and the second demodulation signal providing the measurement point in the position litharge changes from zero to 1 into a predetermined number of zones and measure number of measurement points for each of the zones as a probability density; and
    a correction function generator configured to obtain a cumulative probability density by sequentially cumulating the probability density of the zones with respect to the zone in which the ratio changes from zero to 1, and set a function based on the cumulative probability density to the head position demodulator as a corrected arctangent function for each head.

2. The storage device of claim 1, wherein, when the first demodulation signal is an X-axis coordinate value of the phase plane, the second demodulation signal is a Y-axis coordinate value of the phase plane, and the phase plane is divided in units of 45° to obtain a plurality of quadrants, the probability density measuring module divides the zone with the ratio of zero to 1 to the predetermined number of zones and measures a total sum of the measurement points for each of the zones as a probability density for each of the quadrants including
    a first quadrant from 0° to 45°,
    a fourth quadrant from 180° to 135°,
    a fifth quadrant from 180° to 225°,
    an eighth quadrant from 360° to 315°
where a ratio (|Y|/|X|) of absolute values of the first demodulation signal X and the second demodulation signal Y changes from zero to 1, and
    a second quadrant from 90° to 45°,
    a third quadrant from 90° to 135°,
    a sixth quadrant from 270° to 225°,
    a seventh quadrant from 270° to 315°
where an inverse number (|X|/|Y|) of the ratio of the absolute values of the first demodulation signal X and the second demodulation signal Y changes from zero to 1.

3. The storage device of claim 2, wherein the head position demodulator comprises:
    a ratio calculating module configured to calculate the ratio (|Y|/|X|) or the inverse number (|X|/|Y|) of the ratio that is smaller than or equal to 1 from the absolute values of the first demodulation signal X and the second demodulation signal Y;
    a phase angle converter configured to refer to a correction function conversion table storing a phase angle from 0° to 45° corresponding to the corrected arctangent function, with a ratio that changes in a range of zero to 1 as an index, by the ratio or the inverse number of the ratio calculated by the ratio calculating module and output a corresponding phase angle θ; and
    an angle correction module configured to determine one of the quadrants to which the measurement point belongs by signs of the first demodulation signal X and the second demodulation signal Y and a magnitude comparison of the absolute values, add or subtract the phase angle obtained from the correction function conversion table to or from a predetermined value corresponding to a determined quadrant, and output a phase angle that changes in a range of 0° to 360° in units of two tracks.

4. The storage device of claim 3, wherein the angle correction module is configured to
add the phase angle obtained from the correction function conversion table to 0° when determining that one of the quadrants is the first quadrant,
subtract the phase angle obtained from the correction function conversion table from 90° when determining that one of the quadrants is the second quadrant,
add the phase angle obtained from the correction function conversion table to 90° when determining that one of the quadrants is the third quadrant,
subtract the phase angle obtained from the correction function conversion table from 180° when determining that one of the quadrants is the fourth quadrant,
add the phase angle obtained from the correction function conversion table to 180° when determining that one of the quadrants is the fifth quadrant,
subtract the phase angle obtained from the correction function conversion table from 270° when determining that one of the quadrants is the sixth quadrant,
add the phase angle obtained from the correction function conversion table to 270° when determining that one of the quadrants is the seventh quadrant, and
subtract the phase angle obtained from the correction function conversion table from 360° when determining that one of the quadrants is the eighth quadrant.

5. A head position detection method, comprising:
demodulating with an area demodulator a first demodulation signal and a second demodulation signal having a phase difference of 90° from a read signal by a head of an area demodulation pattern recorded on a medium;
receiving with a head position demodulator the first demodulation signal and the second demodulation signal and outputting a phase angle indicating a direction of a vector formed in a phase plane by the first demodulation signal and the second demodulation signal as a head position signal; and
correcting by a function correction module an arctangent function set to the head position demodulator for each head,
wherein the function correction module comprises:
a measurement holding module holding, as a measurement point, a set of the first demodulation signal and the second demodulation signal output from the area demodulator by moving the head in a direction transversing a track of the medium;
a litharge generator setting the measurement point held in the measurement holding module on the phase plane and generating a position litharge;
a probability density measuring module dividing a zone in which a ratio of the first demodulation signal and the second demodulation signal providing the measurement point in the position litharge changes from zero to 1 into a predetermined number of zones and measuring number of measurement points for each of the zones as a probability density; and
a correction function generator obtaining a cumulative probability density by sequentially cumulating the probability density of the zones with respect to the zone in which the ratio changes from zero to 1, and setting a function based on the cumulative probability density to the head position demodulator as a corrected arctangent function for each head.

6. The head position detection method of claim 5, wherein, when the first demodulation signal is an X-axis coordinate value of the phase plane, the second demodulation signal is a Y-axis coordinate value of the phase plane, and the phase plane is divided in units of 45° to obtain a plurality of quadrants, the probability density measuring module divides the zone with the ratio of zero to 1 to the predetermined number of zones and measures a total sum of the measurement points for each of the zones as a probability density for each of the quadrants including
a first quadrant from 0° to 45°,
a fourth quadrant from 180° to 135°,
a fifth quadrant from 180° to 225°,
an eighth quadrant from 360° to 315°
where a ratio ($|Y|/|X|$) of absolute values of the first demodulation signal X and the second demodulation signal Y changes from zero to 1, and
a second quadrant from 90° to 45°,
a third quadrant from 90° to 135°,
a sixth quadrant from 270° to 225°,
a seventh quadrant from 270° to 315°
where an inverse number ($|X|/|Y|$) of the ratio of the absolute values of the first demodulation signal X and the second demodulation signal Y changes from zero to 1.

7. The head position detection method of claim 6, wherein the head position demodulator comprises:
a ratio calculating module calculating the ratio ($|Y|/|X|$) or the inverse number ($|X|/|Y|$) of the ratio that is smaller than or equal to 1 from the absolute values of the first demodulation signal X and the second demodulation signal Y;
a phase angle converter referring to a correction function conversion table storing a phase angle from 0° to 45° corresponding to the corrected arctangent function, with a ratio that changes in a range of zero to 1 as an index, by the ratio or the inverse number of the ratio calculated by the ratio calculating module and outputting a corresponding phase angle θ; and
an angle correction module determining one of the quadrants to which the measurement point belongs by signs of the first demodulation signal X and the second demodulation signal Y and a magnitude comparison of the absolute values, adding or subtracting the phase angle obtained from the correction function conversion table to or from a predetermined value corresponding to a determined quadrant, and outputting a phase angle that changes in a range of 0° to 360° in units of two tracks.

8. The head position detection method of claim 7, wherein the angle correction module
adds the phase angle obtained from the correction function conversion table to 0° when determining that one of the quadrants is the first quadrant,
subtracts the phase angle obtained from the correction function conversion table from 90° when determining that one of the quadrants is the second quadrant,
adds the phase angle obtained from the correction function conversion table to 90° when determining that one of the quadrants is the third quadrant,
subtracts the phase angle obtained from the correction function conversion table from 180° when determining that one of the quadrants is the fourth quadrant,
adds the phase angle obtained from the correction function conversion table to 180° when determining that one of the quadrants is the fifth quadrant, subtracts the phase angle obtained from the correction function conversion table from 270° when determining that one of the quadrants is the sixth quadrant, adds the phase angle obtained from the correction function conversion table to 270° when determining that one of the quadrants is the seventh quadrant, and subtracts the phase angle obtained from the correction function conversion table from 360° when determining that one of the quadrants is the eighth quadrant.

9. A control circuit, comprising:

an area demodulator configured to demodulate a first demodulation signal and a second demodulation signal having a phase difference of 90° from a read signal by a head of an area demodulation pattern recorded on a medium;

a head position demodulator configured to receive the first demodulation signal and the second demodulation signal and output a phase angle indicating a direction of a vector formed in a phase plane by the first demodulation signal and the second demodulation signal as a head position signal; and a function correction module configured to correct an arctangent function set to the head position demodulator for each head, wherein the function correction module comprises:

a measurement holding module configured to hold, as a measurement point, a set of the first demodulation signal and the second demodulation signal output from the area demodulator by moving the head in a direction transversing a track of the medium;

a litharge generator configured to set the measurement point held in the measurement holding module on the phase plane and generate a position litharge;

a probability density measuring module configured to divide a zone in which a ratio of the first demodulation signal and the second demodulation signal providing the measurement point in the position litharge changes from zero to 1 into a predetermined number of zones and measure number of measurement points for each of the zones as a probability density; and a correction function generator configured to obtain a cumulative probability density by sequentially cumulating the probability density of the zones with respect to the zone in which the ratio changes from zero to 1, and set a function based on the cumulative probability density to the head position demodulator as a corrected arctangent function for each head.

10. The control circuit of claim 9, wherein, when the first demodulation signal is an X-axis coordinate value of the phase plane, the second demodulation signal is a Y-axis coordinate value of the phase plane, and the phase plane is divided in units of 45° to obtain a plurality of quadrants, the probability density measuring module divides the zone with the ratio of zero to 1 to the predetermined number of zones and measures a total sum of the measurement points for each of the zones as a probability density for each of the quadrants including a first quadrant from 0° to 45°,
a fourth quadrant from 180° to 135°,
a fifth quadrant from 180° to 225°,
an eighth quadrant from 360° to 315° where a ratio ($|Y|/|X|$) of absolute values of the first demodulation signal X and the second demodulation signal Y changes from zero to 1, and a second quadrant from 90° to 45°,
a third quadrant from 90° to 135°,
a sixth quadrant from 270° to 225°,
a seventh quadrant from 270° to 315° where an inverse number ($|X|/|Y|$) of the ratio of the absolute values of the first demodulation signal X and the second demodulation signal Y changes from zero to 1.

11. The control circuit of claim 10, wherein the head position demodulator comprises:

a ratio calculating module configured to calculate the ratio ($|Y|/|X|$) or the inverse number ($|X|/|Y|$) of the ratio that is smaller than or equal to 1 from the absolute values of the first demodulation signal X and the second demodulation signal Y;

a phase angle converter configured to refer to a correction function conversion table storing a phase angle from 0° to 45° corresponding to the corrected arctangent function, with a ratio that changes in a range of zero to 1 as an index, by the ratio or the inverse number of the ratio calculated by the ratio calculating module and output a corresponding phase angle θ; and an angle correction module configured to determine one of the quadrants to which the measurement point belongs by signs of the first demodulation signal X and the second demodulation signal Y and a magnitude comparison of the absolute values, add or subtract the phase angle obtained from the correction function conversion table to or from a predetermined value corresponding to a determined quadrant, and output a phase angle that changes in a range of 0° to 360° in units of two tracks.

12. The control circuit of claim 11, wherein the angle correction module is configured to add the phase angle obtained from the correction function conversion table to 0° when determining that one of the quadrants is the first quadrant, subtract the phase angle obtained from the correction function conversion table from 90° when determining that one of the quadrants is the second quadrant, add the phase angle obtained from the correction function conversion table to 90° when determining that one of the quadrants is the third quadrant, subtract the phase angle obtained from the correction function conversion table from 180° when determining that one of the quadrants is the fourth quadrant, add the phase angle obtained from the correction function conversion table to 180° when determining that one of the quadrants is the fifth quadrant, subtract the phase angle obtained from the correction function conversion table from 270° when determining that one of the quadrants is the sixth quadrant, add the phase angle obtained from the correction function conversion table to 270° when determining that one of the quadrants is the seventh quadrant, and subtract the phase angle obtained from the correction function conversion table from 360° when determining that one of the quadrants is the eighth quadrant.

* * * * *